US008649342B2

(12) United States Patent
Kim et al.

(10) Patent No.: US 8,649,342 B2
(45) Date of Patent: Feb. 11, 2014

(54) METHOD OF MAPPING TRANSPORT SEQUENCES TO COMPONENT CARRIERS IN A WIRELESS COMMUNICATION SYSTEM

(75) Inventors: Kihwan Kim, Gyeonggi-do (KR); Jae Hoon Chung, Gyeonggi-do (KR); Yeong Hyeon Kwon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/140,980

(22) PCT Filed: Dec. 18, 2009

(86) PCT No.: PCT/KR2009/007611
§ 371 (c)(1),
(2), (4) Date: Jun. 20, 2011

(87) PCT Pub. No.: WO2010/087581
PCT Pub. Date: Aug. 5, 2010

(65) Prior Publication Data
US 2011/0255496 A1 Oct. 20, 2011

Related U.S. Application Data

(60) Provisional application No. 61/149,319, filed on Feb. 2, 2009.

(30) Foreign Application Priority Data

Aug. 11, 2009 (KR) .................. 10-2009-0073696

(51) Int. Cl.
*H04B 7/216* (2006.01)
*H04W 4/00* (2009.01)
*H03M 13/00* (2006.01)

(52) U.S. Cl.
USPC ............ 370/329; 370/320; 370/330; 714/752

(58) Field of Classification Search
USPC ................. 370/252–312, 329–335, 350–412;
714/752–758
See application file for complete search history.

(56) References Cited

U.S. PATENT DOCUMENTS 7,272,117 B2 * 9/2007 Park et al. ..................... 370/320
7,810,007 B2 * 10/2010 Herrmann .................... 714/746
8,194,601 B2 * 6/2012 Han et al. ..................... 370/329

(Continued)

FOREIGN PATENT DOCUMENTS

| WO | 2008/123037 | 10/2008 |
| WO | 2009/017260 | 2/2009 |
| WO | 2009/149565 | 12/2009 |

OTHER PUBLICATIONS

International Search Report from PCT/KR2009/007611 (PCT corresponding to present application).

*Primary Examiner* — Man Phan
(74) *Attorney, Agent, or Firm* — Morgan, Lewis & Bockius LLP

(57) ABSTRACT

A method of mapping transport sequences to component carriers in a wireless communication system is disclosed. A method of mapping transport sequences to a plurality of component carriers in a transmitter of a wireless communication system that supports carrier aggregation comprises changing the order of the transport sequences in accordance with mapping information; and transmitting the transport sequences of which order has been changed, to a receiver through the plurality of component carriers.

6 Claims, 4 Drawing Sheets

(56) References Cited

U.S. PATENT DOCUMENTS

| | | | |
|---|---|---|---|
| 8,255,761 B1 * | 8/2012 | Pi et al. | 714/752 |
| 8,311,009 B2 * | 11/2012 | Popovic et al. | 370/330 |
| 8,386,878 B2 * | 2/2013 | Pi et al. | 714/752 |
| 2009/0077456 A1 * | 3/2009 | Pi et al. | 714/807 |
| 2009/0303961 A1 | 12/2009 | Popovic et al. | |
| 2010/0103890 A1 * | 4/2010 | Ishii et al. | 370/329 |
| 2011/0080975 A1 * | 4/2011 | Toda et al. | 375/295 |
| 2011/0170489 A1 * | 7/2011 | Han et al. | 370/328 |
| 2011/0205996 A1 * | 8/2011 | Kim et al. | 370/329 |

\* cited by examiner

METHOD OF MAPPING TRANSPORT SEQUENCES TO COMPONENT CARRIERS IN A WIRELESS COMMUNICATION SYSTEM

The present application is a national stage of PCT International Application No. PCT/KR2009/007611 filed Dec. 18, 2009, and claims the benefit of US Provisional Application No. 61/149,319, filed Feb. 2, 2099. The present national stage application also claims the benefit of Korean Patent Application No. 10-2009-0073696, filed Aug. 11, 2009.

TECHNICAL FIELD

The present invention relates to a wireless communication system, and more particularly, to a method of mapping transport sequences to component carriers in a wireless communication system.

BACKGROUND ART

Currently, a long term evolution (LTE) system of which standardization is in progress supports a bandwidth of 100 MHz by collecting five bandwidths each having 20 MHz, through carrier aggregation. The carrier aggregation extends the bandwidth by collecting a plurality of carriers, so as to increase a data rate.

Multi carriers represent all frequency bands used by a base station, and a component carrier means an element carrier constituting multi carriers. Namely, multi carriers are constituted through carrier aggregation of a plurality of component carriers.

Accordingly, a method of mapping a plurality of transport sequences to a plurality of component carriers is required.

According to the related art, a plurality of transport sequences is sequentially mapped to a plurality of component carriers. In this case, a problem occurs in that transmission failure continuously occurs in the sequences mapped to the component carriers having bad performance.

DISCLOSURE OF INVENTION

Technical Problem

As described above, according to the related art, as a plurality of transport sequences are sequentially mapped to a plurality of component carriers, a problem occurs in that transmission failure continuously occurs in the sequences mapped to the component carriers having bad performance.

An object of the present invention is to provide a method of mapping transport sequences to component carriers efficiently.

It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

To achieve the aforementioned object of the present invention, in one aspect of the present invention, a method of mapping transport sequences to a plurality of component carriers in a transmitter of a wireless communication system that supports carrier aggregation comprises changing the order of the transport sequences in accordance with mapping information; and transmitting the transport sequences of which order has been changed, to a receiver through the plurality of component carriers.

To achieve the aforementioned object of the present invention, in another aspect of the present invention, a transmitter of mapping transport sequences to a plurality of component carriers in a wireless communication system that supports carrier aggregation comprises a first means of changing the order of the transport sequences in accordance with mapping information; and a second means of transmitting the transport sequences of which order has been changed, to a receiver by carrying them in the plurality of component carriers.

In this case, the mapping information is for cyclic-shifting the transport sequences.

Also, the mapping information is varied depending on a transmission time interval (TTI).

Also, the transport sequences are transport blocks transferred from a medium access control (MAC) layer.

Moreover, the transport sequences are a series of sequences generated by channel coding the transport blocks transferred from a medium access control (MAC) layer.

Advantageous Effects of Invention

According to the embodiments of the present invention, as transport sequences are dynamically mapped to component carriers, carrier diversity can be enhanced.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In the description, when some part "includes" some elements, it means that the part can further include other elements unless mentioned to the contrary. Also, terminologies ". . . part," ". . . block," and ". . . module" described herein mean a unit for processing at least one function or operation, and can be implemented by hardware, software or combination of hardware and software.

First of all, a method of mapping transport blocks according to the embodiment of the present invention will be described with reference to FIG. 1 and FIG. 2.

A wireless communication system according to the embodiment of the present invention supports carrier aggregation that is to extend a bandwidth by collecting a plurality of carriers to increase a data rate. For example, one carrier is 20 MHz in the LTE system, whereas five carriers each having 20 MHz are collected to extend a bandwidth to 100 MHz in the LTE-A system. Carrier aggregation includes aggregation of carriers within different frequency bands.

Multi carriers represent all frequency bands used by a base station. For example, in the LTE-A system, multi carriers have a bandwidth of 100 MHz. A component carrier means an element carrier constituting multi carriers. Namely, a plurality of component carriers constitute multi carriers through carrier aggregation.

The present invention is based on that each component carrier has one transport block or packet and one hybrid automatic retransmit request (HARQ) entity for a specific user equipment and that each transport block or packet is mapped to one component carrier. The present invention can be also applicable to multiple transport blocks per component carrier which is implemented by high-rank MIMO transmission scheme.

In the embodiment of the present invention, a transmitter changes the order of transport sequences and sequentially transmits the changed transport sequences to a receiver by carrying them in a component carrier.

Figure 1:
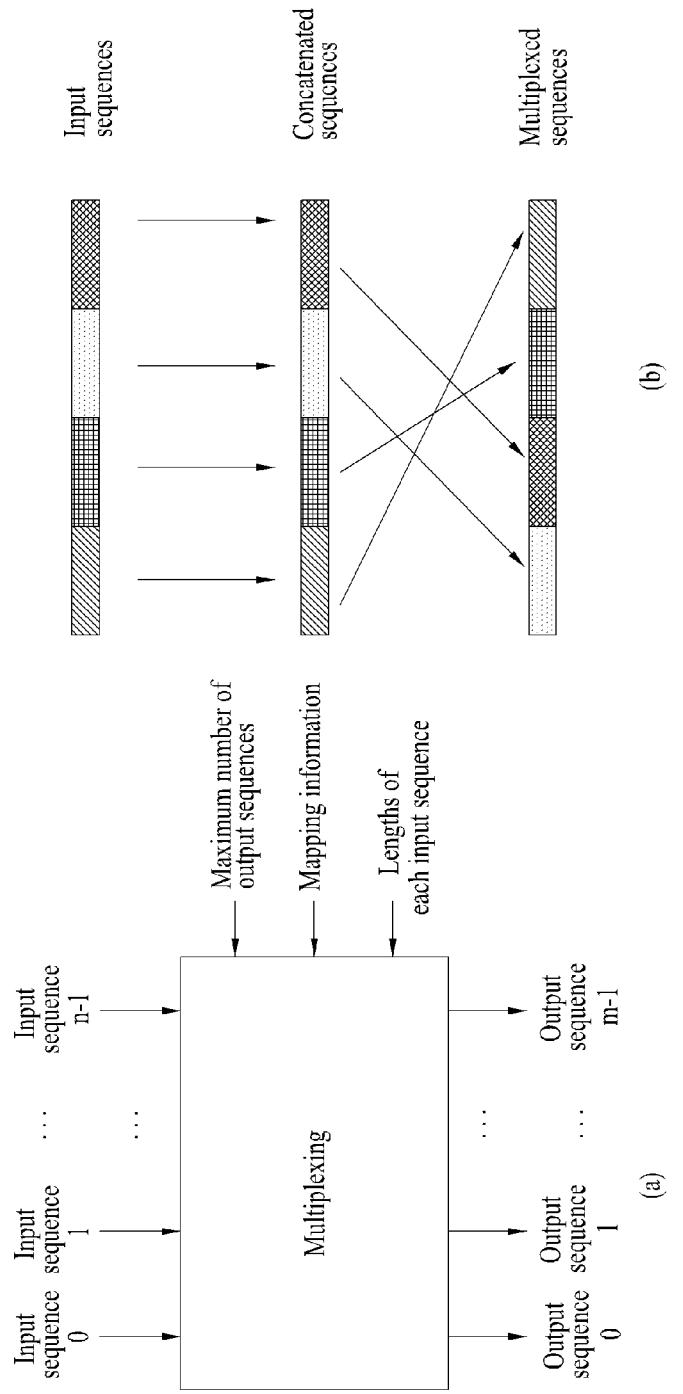
FIG. 1 is a diagram illustrating a method of mapping transport blocks in accordance with the embodiment of the present invention.

FIG. 1 is a diagram illustrating a method of mapping transport blocks in accordance with the embodiment of the present invention.

As illustrated in FIG. 1(a) and FIG. 1(b), according to the mapping method of the present invention, a multiplexer of the transmitter changes the order of input sequences in accordance with mapping information and generates output sequences. The output sequences are sequentially carried in the component carrier and then transmitted.

In FIG. 1(a), input sequences and output sequence may represent packets within a MAC layer, transport blocks transferred from the MAC layer to a physical layer, or a series of channel coded sequences within the physical layer. In other words, the input sequences and the output sequences could be packets, transport blocks, or a series of channel coded sequences depending on the location of the multiplexer. If the multiplexer exists between the MAC layer and the physical layer, the input sequences and the output sequences could be the transport blocks. If the multiplexer exists between a physical processing chain and a coding chain within the physical layer, the input sequences and the output sequences could be a series of channel coded sequences.

The input sequences represent those before dynamic mapping while the output sequences represent those after dynamic mapping.

Examples of main parameters for dynamic mapping include maximum number of output sequences used for a single transmission time interval (TTI), mapping information of input sequences and output sequences, and length of each input sequence.

Examples of the maximum number of output sequences include input sequences, output sequences, or component carriers, which are used for transmission. The number of input sequences may be equal to or different from the number of output sequences. If the mapping information of input sequences and output sequences is varied per TTI, carrier diversity can be enhanced.

FIG. 1(b) illustrates an example of transport block mapping.

In FIG. 1(b), there are four input sequences, wherein the first sequence from the left is input sequence 0 having a length of a, the second sequence is input sequence 1 having a length of b, the third sequence is input sequence 2 having a length of c, and the last sequence is input sequence 3 having a length of d. Also, in FIG. 1(b), there are four output sequences, wherein the first sequence from the left is output sequence 0, the second sequence is output sequence 1, the third sequence is output sequence 2, and the last sequence is output sequence 3.

The mapping relationship between the input sequences and the output sequences will now be described. The input sequence 0 is mapped to the output sequence 3, the input sequence 1 is mapped to the output sequence 2, the input sequence 2 is mapped to the output sequence 0, and the input sequence 3 is mapped to the output sequence 1.

The length of each input sequence can be represented by a length of output sequence mapped to the input sequence using the number of output sequences. Each input sequence can be represented by output sequences of a desired order using the mapping information.

In FIG. 1(b), concatenated sequences correspond to an intermediate process of multiplexing input sequences to output sequence and represent blocks where input sequences are arranged in a line before multiplexing. The concatenated sequences may exist virtually.

In FIG. 1(a) and FIG. 1(b), supposing that the ith input sequence ($I^{(i)}$) is $\{I_0^{(i)}, I_1^{(i)}, \ldots, I_{m-1}^{(i)}\}$, the Oth output sequence ($O^{(o)}$) is $\{O_0^{(o)}, O_1^{(o)}, \ldots, O_{l-1}^{(o)}\}$, the number of component carriers is L, and a mapping pattern of the input sequences and the output sequence is P, the relationship of Equation 1 or Equation 2 is obtained. In this case, m represents bits of the ith input sequence, $I_n^{(i)}$ represents the nth bit of $I^{(i)}$, l represents bits of the oth output sequence, and $O_n^{(o)}$ represents the nth bit of $O^{(o)}$.

$$\text{For } (t=0; t<L; t++)$$

$$j = \text{the number of bits in } I^{P(i)}$$

$$\text{for } (k=0; k<j; k++)$$

$$O_k^{(i)} = I_k^{P(i)} \quad \text{Equation 1}$$

Referring to the Equation 1, the transmitter performs mapping of the input sequences and the output sequences based on the number of component carriers, acquires a length of each input sequence using the mapping pattern P, and then performs direct or dynamic mapping by repeatedly allocating the output sequences as much as the length of the input sequence.

In the Equation 1, $I^{P(i)}$ represents a sequence obtained by mapping $I^{(i)}$ in accordance with the mapping pattern P. Namely, the input sequences equivalent to the number of component carriers are mapped in accordance with the mapping pattern P to generate L number of $I^{P(i)}$, and the kth bit of the ith output sequence becomes the kth bit of $I^{P(i)}$.

For (t=0;t<L;t++)

j=the number of bits in $I^{(i)}$ for (k=0;k<j;k++)

$$O_k^{P(i)} = I_k^{(i)} \quad \text{Equation 2}$$

Referring to the Equation 2, the transmitter acquires a length of each output sequence in the order of the input sequences and then performs direct or dynamic mapping of the input sequences to the output sequences by applying the mapping pattern based on the output sequences.

Figure 2:
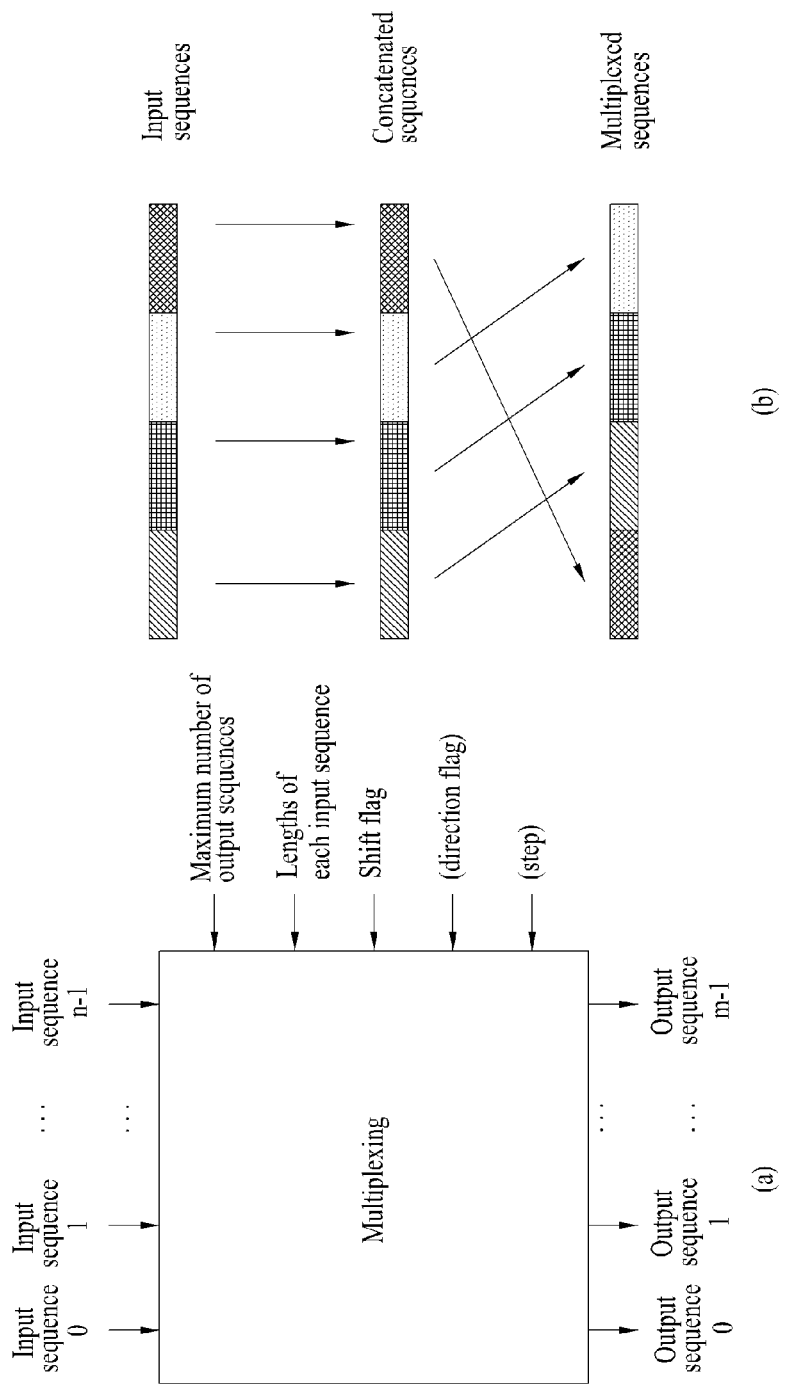
FIG. 2 is a diagram illustrating an example of cyclic mapping of input sequences to output sequences in accordance with the embodiment of the present invention.

FIG. 2 is a diagram illustrating an example of cyclic mapping of input sequences to output sequences in accordance with the embodiment of the present invention.

As illustrated in FIG. 2(a) and FIG. 2(b), according to the mapping method of the present invention, the transmitter changes the order of input sequences in accordance with mapping information and outputs output sequences. The output sequences are sequentially carried in the component carrier and then transmitted.

In FIG. 2(a), input sequences and output sequence may represent packets within a MAC layer, transport blocks transferred from the MAC layer to a physical layer, or a series of channel coded sequences within the physical layer. The input sequences represent those before dynamic mapping while the output sequences represent those after dynamic mapping.

Examples of main parameters for dynamic mapping include maximum number of output sequences used for a single transmission time interval (TTI), length of each input sequence, a shift flag indicating whether cyclic mapping is performed, a direction flag of cyclic mapping, and a step of cyclic mapping.

The shift flag indicates whether to perform cyclic mapping for input sequences, the direction flag indicates whether to perform cyclic mapping toward the right side or the left side, and the step of cyclic mapping indicates how many spaces input sequences are cyclic-shifted. In FIG. 2(b), the input sequences are cyclic-shifted to the right side by one space.

If the direction and step of cyclic mapping are previously determined, the shift flag of cyclic mapping and the step of cyclic mapping may not be used.

FIG. 2(b) illustrates an example of transport block cyclic mapping.

In FIG. 2(b), there are four input sequences, wherein the first sequence from the left is input sequence 0 having a length of a, the second sequence is input sequence 1 having a length of b, the third sequence is input sequence 2 having a length of c, and the last sequence is input sequence 3 having a length of d. Also, in FIG. 2(b), there are four output sequences, wherein the first sequence from the left is output sequence 0, the second sequence is output sequence 1, the third sequence is output sequence 2, and the last sequence is output sequence 3.

The mapping relationship between the input sequences and the output sequences will now be described. The input sequences are cyclic-shifted to the right side by 1 transport block.

The length of each input sequence can be represented by a length of output sequence using the number of output sequences. Each input sequence can be represented by output sequences of an input cyclic order using a previously determined cyclic rule, the shift flag of cyclic mapping, or the step of cyclic mapping.

In FIG. 2(b), concatenated sequences correspond to an intermediate process of multiplexing input sequences to output sequence and represent blocks where input sequences are arranged in a line before multiplexing. The concatenated sequences may exist virtually.

In FIG. 2(a) and FIG. 2(b), supposing that the ith input sequence ($I^{(i)}$) is $\{I_0^{(i)}, I_1^{(i)}, \ldots, I_{m-1}^{(i)}\}$, the Oth output sequence ($O^{(o)}$) is $\{O_0^{(o)}, O_1^{(o)}, O_1^{(o)}, \ldots, O_{l-1}^{(o)}\}$, and the number of component carriers is L, the relationship of Equation 3 or Equation 4 is obtained. In this case, m represents bits of the ith input sequence, $I_n^{(i)}$ represents the nth bit of $I^{(i)}$, 1 represents bits of the oth output sequence, and $O_n^{(o)}$ represents the nth bit of $O^{(o)}$.

For (t=0;t<L;t++)

j=the number of bits in $I^{(i+3)\% L}$ for (k=0;k<j;k++)

$$O_k^{(i)} = I_k^{(i+3)\% L} \quad \text{Equation 3}$$

Referring to the Equation 3, the transmitter performs mapping of the input sequences and the output sequences based on the number of component carriers, acquires a length of each input sequence, and then performs direct or dynamic mapping by repeatedly allocating the output sequences as much as the length of the input sequence.

As expressed in the Equation 3, if a mapping pattern is applied to the input sequences, the mapping pattern of the input sequences and the output sequences is (i+L−1)% L in case of right cyclic shift and (i+1)% L in case of left cyclic shift. Accordingly, in case of FIG. 2(b), the number of component carriers is 4 and the mapping pattern is (i+3)% L.

In the Equation 3, $I^{(i+3)\% L}$ represents a sequence obtained by cyclic-shifting $I^{(i)}$ to the right side by one space. Namely, the input sequences equivalent to the number of component carriers are cyclic-shifted to the right side by one space to generate L number of $I^{(i+3)\% L}$, and the kth bit of the ith output sequence becomes the kth bit of $I^{(i+3)\% L}$.

For (t=0;t<L;t++)

j=the number of bits in $I^{(i)}$ for (k=0;k<j;k++)

$$O_k^{(i+1)\% L} = I_k^{(i)} \quad \text{Equation 4}$$

Referring to the Equation 4, the transmitter acquires a length of each output sequence in the order of the input sequences and then performs direct or dynamic mapping of the input sequences to the output sequences.

As expressed in the Equation 4, if a mapping pattern is applied to the output sequences, the mapping pattern of the input sequences and the output sequences is (i+1)% L in case of right cyclic shift and (i+L−1)% L in case of left cyclic shift. Accordingly, in case of FIG. 2(b), the number of component carriers is 4 and the mapping pattern is (i+1)% L.

Next, a method of generating transport data using a method of mapping transport blocks in accordance with the embodiment of the present invention will be described with reference to FIG. 3 and FIG. 4.

Figure 3:
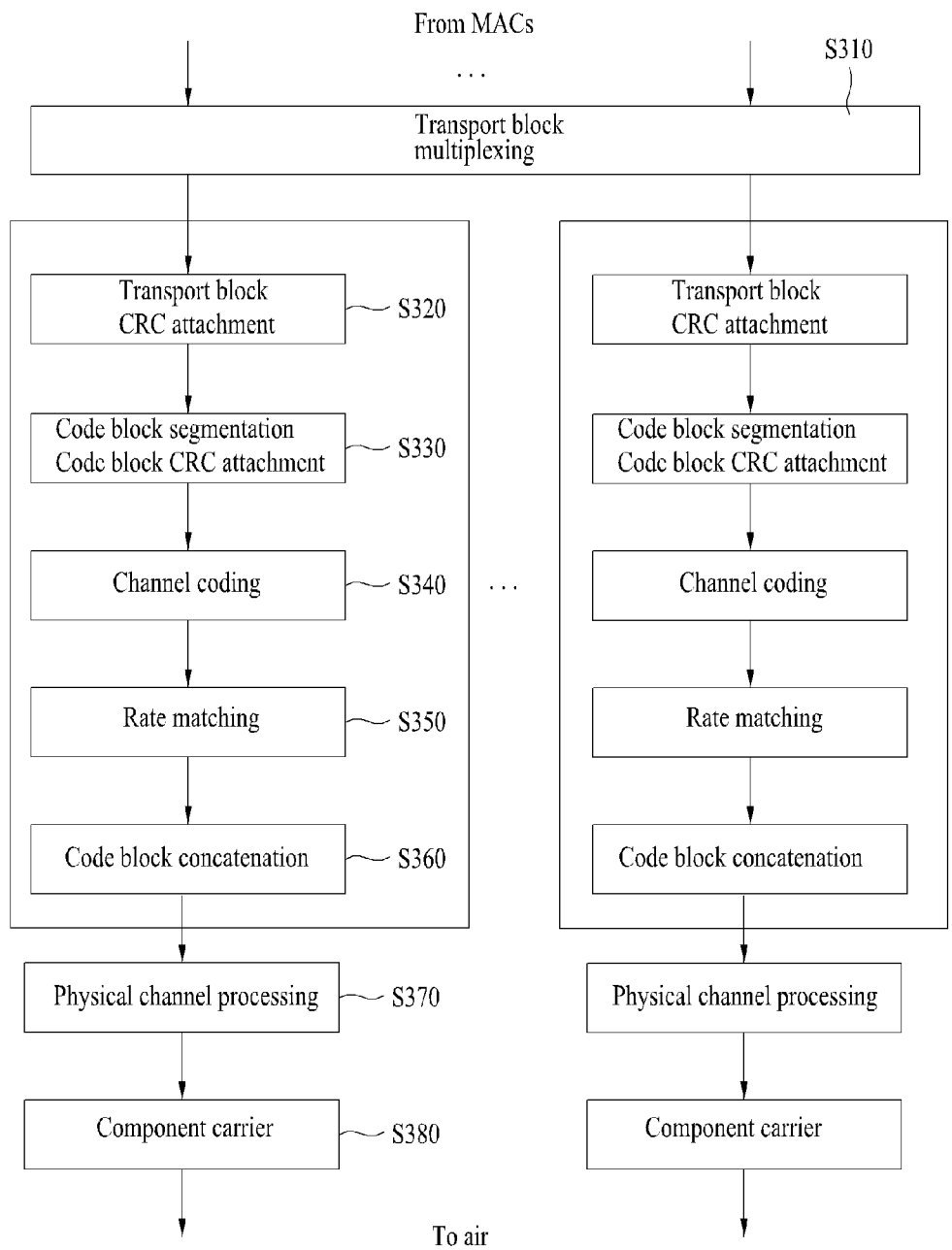
FIG. 3 is a diagram illustrating an example of a method of generating transport data using a method of mapping transport blocks in accordance with the embodiment of the present invention.

FIG. 3 is a diagram illustrating an example of a method of generating transport data using a method of mapping transport blocks in accordance with the embodiment of the present invention.

As illustrated in FIG. 3, the transmitter generates output sequences by changing the order of transport blocks transferred from the MAC layer in accordance with the mapping information (S310). At this time, the transmitter performs dynamic mapping or cyclic mapping of the transport blocks or packets transferred from the MAC layer to the component carriers of the physical layer.

The transmitter attaches a cyclic redundancy check (CRC) to each of the output sequences (S320), segments the transport blocks into code blocks, and attaches a code block CRC (S330) to each of the code blocks. After channel coding is performed for each of the code blocks (S340), rate matching (S350) and code block concatenation (S360) are performed.

Physical channel processing is performed for the code blocks (S370). The code blocks are carried in the component carriers and then transmitted to the receiver (S380).

Figure 4:
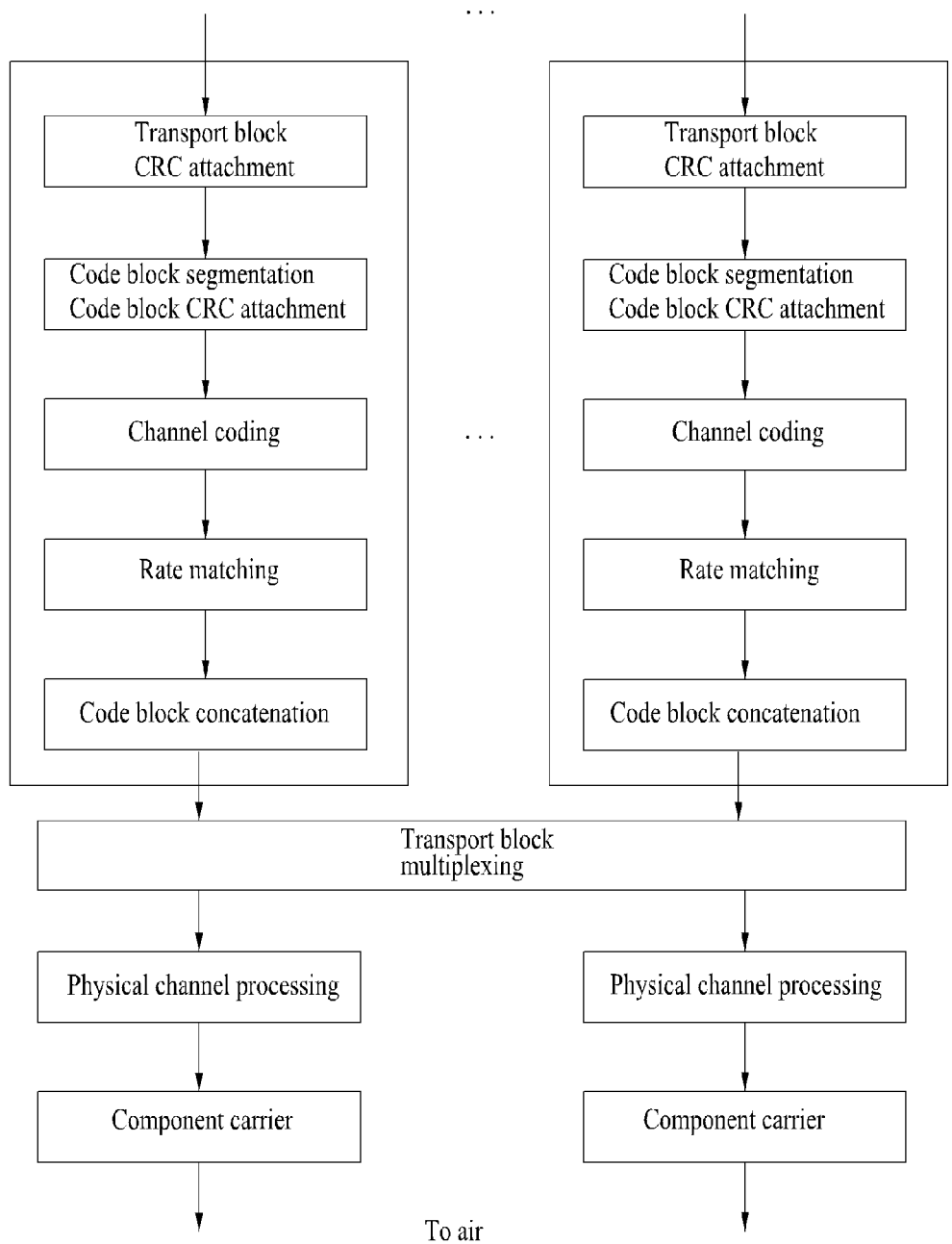
FIG. 4 is a diagram illustrating another example of a method of generating transport data using a method of mapping transport blocks in accordance with the embodiment of the present invention.

FIG. 4 is a diagram illustrating another example of a method of generating transport data using a method of mapping transport blocks in accordance with the embodiment of the present invention.

As illustrated in FIG. 4, the step of mapping the input sequences to the output sequence in accordance with the mapping information can be performed between coding chain of the physical layer and physical processing chain.

In FIG. 4, the transmitter performs dynamic mapping or cyclic mapping of a series of channel coded sequences to the component carriers.

After the transport blocks are coded as illustrated in FIG. 4, if the channel coded input sequences are mapped to the output sequences, the receiver decodes initially transmitted data and retransmitted data in combination, whereby convenience in implementing the system can be obtained. In this case, a decoding chain of the receiver may include a separate HARQ buffer. Alternatively, the decoding chain of the receiver may include a HARQ buffer having a separate controller that can share a buffer without overlap.

If the HARQ transmission scheme is applied to the present invention, the present invention can be applied to all cases where transport blocks or packets are switched during initial transmission and retransmission, there is no switching in initial transmission and retransmission, or there is no switching in initial transmission but switching occurs in retransmission.

Also, the present invention can be applied to all cases of data transmission where a user equipment or multiple transport blocks share single or multiple carrier components in the communication system that supports carrier aggregation of the present invention.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method of mapping transport sequences to a plurality of component carriers in a transmitter of a wireless communication system that supports carrier aggregation, the method comprising:
    changing order of the transport sequences in accordance with mapping information; and
    transmitting the transport sequences of which order has been changed, to a receiver through the plurality of component carriers,
    wherein the transport sequences are a series of sequences generated by channel coding the transport blocks transferred from a medium access control (MAC) layer.

2. The method of claim 1, wherein the mapping information is for cyclic-shifting the transport sequences.

3. The method of claim 1, wherein the mapping information is varied depending on a transmission time interval (TTI).

4. A transmitter of mapping transport sequences to a plurality of component carriers in a wireless communication system that supports carrier aggregation, the transmitter comprising:
    a first means of changing order of the transport sequences in accordance with mapping information; and
    a second means of carrying the transport sequences of which order has been changed in the plurality of component carriers and transmitting the transport sequences to a receiver,
    wherein the first means exists between a coding chain and a physical processing chain of a physical layer.

5. The transmitter of claim 4, wherein the mapping information cyclic-shifts the transport sequences.

6. The transmitter of claim 4, wherein the mapping information is varied depending on a transmission time interval (TTI).

* * * * *